United States Patent
McDaniel et al.

(10) Patent No.: US 7,271,124 B2
(45) Date of Patent: Sep. 18, 2007

(54) PROCESS TO PRODUCE POLYMERS

(75) Inventors: Max P. McDaniel, Bartlesville, OK (US); Elizabeth A. Benham, Bartlesville, OK (US); Al R. Wolfe, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 196 days.

(21) Appl. No.: 10/877,191

(22) Filed: Jun. 25, 2004

(65) Prior Publication Data

US 2004/0254323 A1 Dec. 16, 2004

Related U.S. Application Data

(60) Continuation of application No. 10/319,393, filed on Dec. 13, 2002, now Pat. No. 7,071,276, which is a division of application No. 09/222,659, filed on Dec. 30, 1998, now Pat. No. 6,495,638.

(51) Int. Cl.
*B01J 27/132* (2006.01)

(52) U.S. Cl. ............... 502/228; 502/103; 502/117; 502/113; 526/113; 526/104

(58) Field of Classification Search ......... 502/103, 502/117, 228, 113; 526/113, 104
See application file for complete search history.

(56) References Cited

U.S. PATENT DOCUMENTS

| 4,315,088 | A |   | 2/1982  | Kitagawa et al.         |
|-----------|---|---|---------|-------------------------|
| 4,325,837 | A | * | 4/1982  | Capshew et al. ... 502/108 |
| 4,364,842 | A |   | 12/1982 | McDaniel et al.         |
| 4,364,854 | A |   | 12/1982 | McDaniel et al.         |
| 4,364,855 | A |   | 12/1982 | McDaniel et al.         |
| 4,397,765 | A |   | 8/1983  | McDaniel                |
| 4,424,341 | A |   | 1/1984  | Hanson et al.           |
| 4,444,962 | A |   | 4/1984  | McDaniel et al.         |
| 4,444,964 | A |   | 4/1984  | McDaniel et al.         |
| 4,444,965 | A |   | 4/1984  | McDaniels et al.        |
| 4,444,966 | A |   | 4/1984  | McDaniel et al.         |
| 4,444,968 | A |   | 4/1984  | McDaniel et al.         |
| 4,501,885 | A |   | 2/1985  | Sherk et al.            |
| 4,504,638 | A |   | 3/1985  | McDaniel et al.         |
| 4,547,479 | A |   | 10/1985 | Johnson et al.          |
| 4,613,484 | A |   | 9/1986  | Ayres et al.            |
| 4,668,808 | A |   | 5/1987  | Smith                   |
| 4,737,280 | A |   | 4/1988  | Hanson                  |
| 4,806,513 | A | * | 2/1989  | McDaniel et al. ... 502/107 |
| 5,037,911 | A |   | 8/1991  | McDaniel et al.         |
| 5,171,801 | A |   | 12/1992 | Martin et al.           |
| 5,221,720 | A |   | 6/1993  | McDaniel et al.         |
| 5,401,820 | A |   | 3/1995  | McDaniel et al.         |
| 5,502,265 | A |   | 3/1996  | Shveima                 |
| 5,908,679 | A |   | 6/1999  | Berthold et al.         |
| 6,111,037 | A |   | 8/2000  | Auburn et al.           |
| 6,525,148 | B1|   | 2/2003  | McDaniel et al.         |

* cited by examiner

*Primary Examiner*—Ling-Sui Choi
(74) *Attorney, Agent, or Firm*—Fletcher Yoder

(57) ABSTRACT

A process to produce ethylene polymers is provided.

58 Claims, No Drawings

PROCESS TO PRODUCE POLYMERS

CROSS-REFERENCE TO RELATED APPLICATIONS

This application is a continuation application of U.S. patent application Ser. No. 10/319,393 filed Dec. 13, 2002 2003/0162915 and now U.S. Pat. No. 7,071,276) which is a divisional application of U.S. patent application Ser. No. 09/222,659 filed Dec. 30, 1998 (now U.S. Pat. No. 6,495,638), each of which is incorporated herein by reference in its entirety.

FIELD OF THE INVENTION

This invention is related to the field of processes that produce polymers, where said polymers comprise polymerized ethylene. The phrase "ethylene polymers" as used in this application includes homopolymers of ethylene, and copolymers of ethylene with another monomer.

BACKGROUND OF THE INVENTION

There are many production processes that produce ethylene polymers. Ethylene polymers are utilized in many products, such as, for example, films, coatings, fibers, and pipe. Producers of such ethylene polymers are continuously conducting research to find improved ethylene polymers.

This invention provides ethylene polymers with improved properties.

SUMMARY OF THE INVENTION

It is an object of this invention to provide a process to produce a catalyst system.

It is another object of this invention to provide said catalyst system.

It is another object of this invention to provide a process to use said catalyst system to polymerize ethylene, or to copolymerize ethylene with at least one other monomer, to produce ethylene polymers.

It is another object of this invention to provide said ethylene polymers.

It is yet another object of this invention to provide a process to use said ethylene polymers to produce a manufacture.

It is still another object of this invention to provide a manufacture comprising said ethylene polymers.

In accordance with this invention a process is provided. This process comprises blending a first component and a second component to produce a catalyst system wherein:
  (1) said first component of said catalyst system comprises chromium on a support, and wherein the amount of said chromium on said support is from about 0.05 to 5 weight percent based on the weight of said support, and wherein said support comprises fluorided alumina, and wherein said support has a surface area from about 200 to about 550 square meters per gram, and wherein said support has a pore volume from about 0.7 to about 2.5 cubic centimeters per gram, and wherein said first component has been activated at a temperature in the range of about 500° C. to about 900° C.; and
  (2) said second component is a transition metal halide catalyst.

In another embodiment of this invention, a composition comprising said catalyst system is provided.

In another embodiment of this invention, a process is provided comprising: polymerizing ethylene, or copolymerizing ethylene with at least one other monomer, to produce ethylene polymers, wherein said polymerizing is conducted in a polymerization zone, and wherein said polymerizing is conducted using said catalyst system, and wherein said polymerizing is conducted in the presence of a first cocatalyst and a second cocatalyst, and wherein said first cocatalyst comprises trialkyl boron, and wherein said second cocatalyst comprises trialkyl aluminum.

In yet another embodiment of this invention, said ethylene polymers are provided.

In yet another embodiment of this invention, a process for using said ethylene polymers to produce a manufacture is provided.

In still another embodiment of this invention, a manufacture is provided comprising said ethylene polymers.

These and other objects of this invention will become more evident from the following description and claims.

DETAILED DESCRIPTION OF THE INVENTION

A process comprising blending a first component and a second component to produce a catalyst system, is provided.

Said blending can be accomplished by any means known to those skilled in the art. Said first component and said second component can be premixed prior to being utilized in a polymerization zone or said first and second component can be routed into a polymerization zone individually in specified portions. For example, said first and second components can be dry blended together in a mixer or added to a feed stream that leads to a reactor.

Said first component of said catalyst system comprises chromium on a support. The amount of said chromium on said support is from about 0.05 to about 5 weight percent, preferably about 0.1 to about 3 weight percent, and most preferably from 0.8 to 2.5 weight percent, where such weight percents are based on the weight of the support. The chromium is usually in the form of chromium oxide.

The support comprises fluorided alumina.

The phrase "fluorided alumina" is meant to describe an alumina treated with a fluorine-containing compound, in order to add fluoride to said alumina. Reaction of the fluorine-containing compound with an alumina can take place on impregnation or on activation. Generally, the fluoride is added to said alumina by forming a slurry of the alumina in a solution of the fluoriding agent and a suitable solvent such as alcohol or water. Particularly suitable are one to three carbon atom alcohols because of their volatility and low surface tension. A suitable amount of the solution is utilized to provide the desired concentration of fluoride on the alumina after drying. Drying can be effected by any method known in the art. For example, said drying can be completed by suction filtration followed by evaporation or drying under vacuum. The alumina can also be calcined prior to being treated with fluoride and/or chromium, such as in air at about 200 to about 800° C.

Any organic or inorganic fluorine-containing compound which can form a fluoride with alumina can be used in this invention. Suitable fluorine-containing compounds include, but are not limited to, hydrofluoric acid (HF), ammonium fluoride ($NH_4F$), ammonium bifluoride ($NH_4HF_2$), ammonium fluoroborate ($NH_4BF_4$), ammonium silicofluoride (($NH_4)_2SiF_6$), and mixtures thereof. The most preferred fluorine-containing compound is ammonium bifluoride, due to ease of use and availability. The amount of fluoride on said support is generally in the range of about 1 to about 10, preferably about 3 to about 8 weight percent fluoride, based on the weight of the support.

The support should have a surface area from about 200 to about 550 square meters per gram. It is more preferred when the support has a surface area from about 225 to about 425 square meters per gram, and it is most preferred when said support has a surface area from 250 to 400 square meters per gram.

The fluorided support should have a pore volume from about 0.7 to about 2.5 cubic centimeters per gram. It is more preferred when the support has a pore volume from about 0.8 to about 1.8 cm$^3$/g, and it is most preferable when said support has a pore volume from 1 to 1.7 cm$^3$/gram.

Methods of producing said first component are known in the art. See, for example, U.S. Pat. Nos. 3,900,457; 4,081,407; 4,392,990; 4,405,501; 4,735,931; 4,981,831; the disclosures of which are hereby incorporated by reference.

Said first component should be activated in an oxidizing ambient at a temperature from about 500 to about 900° C. It is even more preferred when the temperature is from about 550 to about 700° C., and it is most preferred when the temperature is from 550 to 650° C. Currently, the preferred oxidizing ambient is air. This activation is carried out for a time period of about 1 minute to about 50 hours. This allows for at least a portion of any chromium in a lower valance state to be converted to a hexavalent state.

Said first component after being activated is preferably reduced. This reduction converts at least a portion of the hexavalent chromium to a lower valent state. Carbon monoxide is preferably used in this reduction. In general, this reduction is conducted at a temperature in the range of about 200 to 500° C., preferably 300–400° C., for about 1 minute to about 24 hours. After this reduction the first component is flushed with nitrogen to remove the reducing agent.

Said second component comprises a transition metal halide catalyst as disclosed in U.S. Pat. No. 4,325,837, herein incorporated by reference. Generally, said transition metal halide catalyst comprises a metal halide compound and a transition metal compound. Said metal halide compound is selected from the group consisting of metal dihalides and metal hydroxyhalides. Currently, titanium is the preferred transition metal and magnesium dichloride is the preferred metal halide.

The second component of the catalyst of the present invention is a transition metal halide catalyst which comprises a composition of matter resulting from the chemical combination of a precipitating agent with the combination of a metal halide compound and a transition metal compound, as disclosed in U.S. Pat. No. 4,325,837. The metal halide compound is selected from metal dihalides and metal hydroxyhalides and the metal of the metal halide compound is selected from Group IIA and Group IIB metals of the Mendeleev Periodic Table. The transition metal of the transition metal compound is selected from Group IVB and Group VB transition metals of the Mendeleev Periodic Table and the transition metal is bonded to at least one atom selected from oxygen, nitrogen and sulfur, and said oxygen, nitrogen and sulfur atoms are in turn bonded to a carbon atom of a carbon containing radical. As used herein by the term "Mendeleev Periodic Table" is meant the Periodic Table of the Elements as shown in the inside front cover of Perry, Chemical Engineer's Handbook, 4th Edition, McGraw Hill & Co. (1963).

The metal halide compound is selected from metal dihalide compounds and metal hydroxyhalide compounds and the metal of the metal halide compound is selected from Group IIA and Group IIB metals, such as for example beryllium, magnesium, calcium and zinc. Some suitable metal halide compounds include for example, beryllium dichloride, beryllium dibromide, beryllium hydroxyiodide, magnesium dichloride, magnesium bromide, magnesium hydroxychloride, magnesium diiodide, magnesium difluoride, calcium dichloride, calcium dibromide, calcium hydroxybromide, zinc dichloride, zinc difluoride, and zinc hydroxychloride. While metal hydroxyhalide compounds are known in the art, they are not as common and as readily available as metal dihalide compounds; therefore, metal dihalides are preferred.

The transition metal of the transition metal compound noted herein is selected from Group IVB and Group VB transition metals and is generally selected from titanium, zirconium, and vanadium although other transition metals can be employed. Excellent results have been obtained with titanium compounds and they are preferred. The transition metal is bonded to at least one radical selected from the group consisting of hydrocarbyloxides, amides, imides, and mercaptides. Some of the titanium compounds suitable for use include for example titanium tetrahydrocarboxyloxides, titanium tetraimides, titanium tetraamides and titanium tetramercaptides. Other transition metal compounds include for example zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

The precipitating agent is selected from the group consisting of organometallic compounds in which the metal is selected from metals of Groups I to III of the Mendeleev Periodic Table, metal halides and oxygen-containing halides of elements selected from Groups IIIA, IVA, IVB, VA, and VB of the Mendeleev Periodic Table, hydrogen halides, and organic acid halides expressed as RC(O)X, wherein R is an alkyl, an aryl, a cycloalkyl, or a combination thereof having from 1 to about 12 carbon atoms, and X is a halogen atom.

Some organometallic compounds suitable for use as the precipitating agent, in which the metal of the organometallic compound is selected from metals of Group I, Group II, or Group III of the Mendeleev Periodic Table, include, for example, lithium alkyls, Grignard reagents, dialkyl magnesium compounds, dialkyl zinc compounds, organoaluminum compounds, and the like.

Some metal halides and oxygen-containing halides of elements selected from Groups IIIA, IVA, IVB, VA, and VB suitable for use as the precipitating agent preferably include such as, for example, aluminum tribromide, aluminum trichloride, aluminum triiodide, tin tetrabromide, tin tetrachloride, silicon tetrabromide, silicon tetrachloride, phosphorous oxychloride, phosphorous trichloride, phosphorous pentabromide, vanadium tetrachloride, vanadium oxytrichloride, vanadyl trichloride, zirconium tetrachloride, and the like.

The hydrogen halides suitable for use as the precipitating agent include preferably such as, for example, hydrogen chloride, hydrogen bromide, and the like.

The organic acid halides suitable for use as the precipitating agent preferably include such as, for example, acetyl chloride, propionyl fluoride, dodecanoyl chloride, 3-cyclopentylpropionyl chloride, 2-naphthoyl chloride, benzoyl bromide, benzoyl chloride, and the like.

The molar ratio of the transition metal compound to the precipitating agent can be selected over a relatively broad range. Generally, the molar ratio of the transition metal to the precipitating agent is within a range of from about 10:1 to about 1:10 and more generally within a range of about 2:1 to about 1:3 since a molar ratio within the latter range usually produces a catalyst which can be employed as an especially active ethylene polymerization catalyst.

Particularly effective catalysts have been obtained by treating the second component of this invention with a halide ion exchanging source, such as for example titanium tetrahalide. The term "halide ion exchanging source" is herein used for convenience; however, it is not intended thereby to limit the invention by the theory whereby the action of such compounds can be explained. Rather, the invention encompasses the compounds used whatever the theory of action may be. Some examples of suitable halide ion exchanging sources that can be employed are titanium tetrahalides, such as titanium tetrachloride, vanadium oxychloride, and zirconium tetrachloride.

Magnesium dihalides, particularly magnesium dichloride, is preferred for the metal halide component because it is readily available and relatively inexpensive.

The transition metal is generally selected from titanium, zirconium and vanadium. Titanium tetrahydrocarbyloxides are the preferred titanium compounds for combining with the metal halide compound. Suitable titanium tetrahydrocarbyloxide compounds include those expressed by the general formula $Ti(OR)_4$ wherein each R is individually selected from alkyl, cycloalkyl, aryl, alkaryl, and aralkyl hydrocarbon radicals containing from about 1 to about 20 carbon atoms per radical and each R can be the same or different. Titanium tetrahydrocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide and titanium tetraphenoxide. Of the titanium tetrahydrocarbyloxides, titanium tetraalkoxides are generally preferred and titanium tetraethoxide is particularly preferred.

The molar ratio of the transition metal compound to the metal halide compound can be selected over a relatively broad range. Generally the molar ratio is within the range of about 10:1 to about 1:10, preferably between about 3:1 and 0.5:2, however, the most common molar ratios are with the range of about 2:1 to about 1:2. When titanium tetrahydrocarbyloxide and magnesium dichloride are employed, a molar ratio of titanium to magnesium of about 2:1 is presently recommended as most all of the magnesium compound apparently goes into solution easily.

The metal halide compound and the transition metal compound employed are normally mixed together by heating, e.g. refluxing, these two components together in a suitable dry (essential absence of water) solvent or diluent, which is essentially inert to these components and the product produced. By the term "inert" is meant that the solvent does not chemically react with the dissolved components such as to interfere with the formation of the product or the stability of the product once it is formed. Such solvents or diluents include, for example, n-pentane, n-hexane, n-heptane, methylcyclohexane, toluene, xylenes and the like. It is emphasized that aromatic solvents are preferred, such as for example xylene because of the solubility of the metal halide compound and the transition metal compound is higher in aromatic solvents as compared to aliphatic solvents.

The component produced from contact of the metal halide and transition metal compound is treated with an organometallic precipitation agent. Generally this is an organoaluminum halide compound which includes for example, dihydrocarbylaluminum monohalides of the formula $R'_2AlX$, monohydrocarbylaluminum dihalides of the formula $R'AlX_2$ and hydrocarbylaluminum sesquihalides of the formula $R'_xAl_2X_3$ wherein each R' in the above formulas is individually selected from linear and branched chain hydrocarbyl radicals containing from 1 to about 20 carbon atoms per radical and can be the same or different and each X is a halogen atom and can be the same or different. Some suitable organoaluminum halide compounds include, for example, methylaluminum dibromide, ethyl aluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and the like. Ethylaluminum sesquichloride, ethylaluminum dichloride, and diethylaluminum chloride are preferred.

The above-described mixing of the catalyst component solution and the precipitating agent can be carried out under an olefin atmosphere. The olefin atmosphere employed can be an aliphatic mono-1-olefin having from 2 to about 18 carbon atoms per molecule. Thus, the olefin can include such as, for example, ethylene, propylene, 1-butene, 1-pentene, 1-hexene, 1-heptene, 1-octene, 1-nonene and 1-decene and mixtures of one or more thereof.

The solid catalyst component is subjected to a halide ion exchanging source either before or after the prepolymerization step. The halide ion exchanging source can be a halide of a transition metal. Some examples of suitable halide ion exchanging sources that can be employed are titanium tetrahalides, such as titanium tetrachloride.

Optionally, said second component can further comprise an anti-caking agent. Generally, said anti-caking agent comprises a fumed refractory oxide. Said fumed refractory oxide can be selected from the group consisting of fumed silica, fumed titanium dioxide, and fumed alumina. Fumed refractory oxide is disclosed in U.S. Pat. No. 5,179,178, herein incorporated by reference. Said anti-caking agent can be added to said second component in an amount ranging from about 2 weight % to about 20 weight % based on the weight of the second component.

In another embodiment of this invention, a process is provided comprising polymerizing ethylene, or copolymerizing ethylene and at least one other monomer, to produce an ethylene polymer.

Said "at least one other monomer" can be olefins having from 4 to about 16 carbon atoms per molecule. Suitable monomers, that can be polymerized with ethylene to produce copolymers with excellent properties, include, but are not limited to, 1-butene, 1-pentene, 4-methyl-1-pentene, 1-hexene, 1-octene.

This polymerizing is conducted in a polymerization zone. Polymerization can be carried out in any manner known in the art such as gas phase, solution or slurry polymerization conditions. Said polymerization zone includes any reactor known in the art. For example, a stirred reactor can be utilized for a batch process, or the polymerizing can be carried out continuously in a loop reactor.

A preferred polymerization technique is that which is referred to as a particle form, or slurry process, wherein the temperature is kept below the temperature at which the polymer becomes soluble in the diluent. Such polymerization techniques are well known in the art and are disclosed, for instance, in Norwood, U.S. Pat. No. 3,248,179, the disclosure of which is hereby incorporated by reference.

Two preferred polymerization methods for the slurry process are those employing a loop reactor of the type disclosed in Norwood and those utilizing a plurality of stirred reactors either in series, parallel or combinations thereof wherein the reaction conditions are different in the different reactors.

Said polymerizing is conducted at a temperature from about 80 to about 110° C. However, it is preferred when said polymerizing is conducted at a temperature from about 85 to about 95° C.

Said polymerizing is conducted in the presence of a first cocatalyst and a second cocatalyst. Said first cocatalyst comprises trialkyl boron. In general, the alkyl groups of the trialkylboron cocatalyst should have from about 1 to about 10 carbon atoms and preferably 2 to 4 carbon atoms. Examples include, but are not limited to, triethylboron, tripropylboron, and trimethylboron. However, most preferred is triethylboron. The amount of trialkylboron used in a polymerization, stated in parts per million by weight, based on the weight of the diluent in the reactor, is from about 0.01 parts per million to about 20 parts per million. Preferably, it is from about 0.05 parts per million to about 10 parts per million, and most preferably it is from 0.5 parts per million to 8 parts per million.

Said second cocatalyst comprises trialkylaluminum. Generally, the alkyl groups of the trialkylaluminum cocatalyst should have from about 1 to about 10 carbon atoms and preferably, 2 to 4 carbon atoms. Examples, include, but are not limited to, triethylaluminum, tripropylaluminum, and trimethylaluminum. However, most preferred is triethylaluminum. The amount of trialkylaluminum used in the polymerization, in parts per million by weight, based on the weight of the diluent in the reactor, is from about 0.01 parts per million to about 20 parts per million, preferably, it is from about 0.05 parts per million to about 10 parts per million. Most preferably, it is from 0.5 to 8 parts per million.

Hydrogen is present in the polymerization zone. Currently, about 0.5 to about 3 mole percent hydrogen is used. However, it is preferred when about 0.8 to about 2.5 mole percent is present in said polymerization zone, and it is more preferred when 1.2 to 2.2 mole percent of hydrogen is present in said polymerization zone. These mole percents are based on the moles of the diluent in said polymerization zone.

Said ethylene polymers can be used to produce manufactures. Said ethylene polymers can be formed into a manufacture by any means known in the art. For example, said ethylene polymers can be formed into a manufacture by blow molding, injection molding, and extrusion molding. Further information on processing said ethylene polymers into a manufacture can be found in MODERN PLASTICS ENCYCLOPEDIA, 1992, pages 222–298.

One important application for said ethylene polymers is the production of pipe. Pipe produced from said ethylene polymers typically are formed from an extrusion process. Further information on manufacturing pipe can be found in PLASTICS MATERIALS AND PROCESSES, 1982, pp. 591–592.

It is preferred when said ethylene polymers have a HLMI of about 2–20, preferably about 5–15, and most preferably 8–13 grams per ten minutes.

It is also preferred when said ethylene polymers have a density of about 0.945–0.955, preferably about 0.947–0.953, and most preferably 0.948–0.951 grams per cubic centimeter.

It is also preferred when said ethylene polymers have a shear ratio (HLMI/MI) of greater than about 300, preferably greater than 400, and most preferably greater than 500.

It is also preferred when said ethylene polymers have a polydispersity (Mw/Mn) of greater than about 40, preferably greater than 50, and most preferably greater than 60.

It is also preferred when the ethylene polymers have a pent test of greater than about 500, preferably greater than 1000, and most preferably greater than 2000.

EXAMPLES

These examples are provided to further illustrate the invention.

The following analytical methods were utilized.

The density was determined in grams per cubic centimeter (g/cc) on a compression molded sample, cooled at 15° C. per hour, and conditioned for 40 hours at room temperature in accordance with ASTM D1505 and ASTM D1928, procedure C.

The high load melt index (HLMI, g/10 min) was determined in accordance with ASTM D1238 at 190° C. with a 21,600 gram weight.

The melt index (MI, g/10 min) was determined in accordance with ASTM D1238 at 190° C. with a 2,160 gram weight.

The Pent test was determined in accordance with ASTM F 1473-94.

The Tensile Strength was determined in accordance with ASTM D 638.

The polydispersity (Mw/Mn) was determined using size exclusion chromatography analyses that were performed at 140° C. on a Walters, model 150 GPC with a refractive index detector. A solution concentration of 0.25 weight percent in 1,2,4 trichlorobenzene was found to give reasonable elution times.

The polymers in these examples were prepared in a continuous, particle form process by contacting a catalyst system with ethylene and 1-hexene. A liquid full 15.2 cm diameter pipe loop reactor having a volume of 87 liters was utilized. Isobutane was used as the diluent. Hydrogen was employed. The reactor was operated to have a residence time of 1.25 hours.

The first component of the catalyst system was added through a 0.35 cc circulating ball-check feeder, and the second component of the catalyst system was added simultaneously to the reactor through a separate 0.08 cc ball check feeder. The reactor temperature was set at 88° C., depending on the particular experiment, and the pressure was 4.1 Mpa (590 psig). The ethylene polymer was removed from the reactor and recovered in a flash tank. A vulcan dryer was used to dry the ethylene polymer under nitrogen at about 60 to 80° C.

The following feedstocks were utilized in the experiments. Ethylene that had been dried over alumina was used as a monomer. Isobutane that had been degassed by fractionation and dried over alumina was used as the diluent. Triethylboron or triethylaluminum was also sometimes used as cocatalysts as indicated in the examples below.

A first component was made from a commercially available alumina obtained from AKZO Nobel as Ketjen Grade L alumina, which contained 2% silica. This alumina had a pore volume by water adsorption of 2.1 cc/gm and a surface area of about 350 square meters per gram after calcining at 600° C. Chromium was added to this alumina, along with a fluorine-containing compound, to form the first component of said catalyst system. This was accomplished by impregnating the support to incipient wetness or somewhat less, with a methanol solution of chromium (III) nitrate containing 0.5 g Cr/100 ml. This chromium containing support was then dried under vacuum for 8 hours at 110° C. Then, the chromium containing support was treated with a methanol solution of ammonium bifluoride before being dried again under vacuum at 110° C. to produce said first component. Said first component of said catalyst system contained 2 wt % Cr and 6 wt % ammonium bifluoride based on the weight of the support. To activate said first component, it was calcined at about 590° C. in dry air in a fluidized bed for 6 hours, then it was cooled in nitrogen to 370° C. and exposed to carbon monoxide for two hours, followed by flushing with pure nitrogen for 30 minutes and then cooled down to room temperature and stored under nitrogen.

A second component of said catalyst system was prepared according to U.S. Pat. No. 4,325,837. Said second component was prepared by contacting magnesium dichloride and titanium ethoxide in xylene to obtain a solution, then contacting the solution with ethyl aluminum dichloride to obtain a solid, then contacting the solid with ethylene to obtain a prepolymerized solid, and then contacting the resulting prepolymerized solid with titanium tetrachloride to form said second component. Said second component contained about 10 wt % titanium and about 10 wt % prepolymer. Said second component was then treated with a heptane solution of triethyl aluminum (TEA) containing enough TEA to equal 0.6 mole of aluminum for each mole of titanium in the catalyst. A fumed silica sold by Cabot Corporation under the name HS-5 was added to said second component. The fumed silica was added as an anti-caking agent as described in U.S. Pat. No. 5,179,178 in the amount of 15 wt % based on the weight of the second component of said catalyst system.

Example One

To make high quality ethylene polymer that can be used to manufacture pipe, said first component and said second component described above were introduced into the reactor simultaneously at a temperature of 88° C. The first component was fed at the rate of 80 discharges per hour and the second component at the rate of 6 discharges per hour. When corrected for activity differences between the first and second components, this corresponds to a ethylene polymer contribution of approximately 65% from said first component and 35% from said second component. Isobutane was fed to the reactor at a rate of 63.23 lbs per hour, and ethylene was fed at 288 lbs per hour to maintain a reactor concentration of 10.06 mole percent based on the diluent. Hydrogen concentration was held at 1.923 mol percent. 1-hexene was fed to the reactor at 3.24 lbs per hour in order to hold a concentration in the diluent of 2.677 mole percent. The cocatalyst consisted of a mixture of triethyl boron and triethyl aluminum, and it was pumped into the reactor at a rate equal to 1.30 and 5.34 ppm based on the weight of the diluent. The reactor residence time was 1.14 hours. The slurry consisted of 74.5 percent liquid diluent and 25.5 percent solid polymer. Total reactor pressure was 590 psig.

The ethylene polymer produced was analyzed, and the results are summarized in Table 1. The ethylene polymer produced was compared to TR-480, a standard high quality pipe resin sold commercially by Driscopipe Company.

Note that the invention resin has a higher tensile strength than TR-480 due to the higher density of the resin. However, this improvement was achieved without serious deterioration of the other pipe properties, as would be normally expected. This is an advantage of the invention resin.

The analytical data in Table I was also compared to a TR-480 high density resin. The density of TR-480 was raised to show the effect on pipe properties.

These results indicate that the ethylene polymer produced from the process of this invention has superior properties to the TR-480 and to the TR-480 high density control.

Example Two

For comparison, the first component and the second component of said catalyst system were utilized alone under the same reactor conditions described above. The ethylene polymers produced were analyzed, and the data obtained are shown in Table 2.

TABLE 1

| Resin | Invention (Dual Catalysts) | TR-480 Control | High Density TR-480 Control |
|---|---|---|---|
| HLMI (g/10 min) | 11.5 | 12 | 7 |
| HLMI/MI | 550 | 110 | 128 |
| Density (g/cc) | .949 | .944 | .949 |
| Tensile Strength, psi | 3500 | 3250 | 3450 |
| Pent Test, hrs | >2000 | 100 | 53 |

TABLE 2

| Catalyst | First Component | Second Component |
|---|---|---|
| Melt Index (g/10 min) | 0 | 50.2 |
| High Load Melt Index (g/10 min) | 2.2 | 180 |
| Density (g/cc) | 0.945 | 0.965 |

That which is claimed is:

1. A catalyst system comprising a first component and a second component wherein:
   a) the first component comprises chromium on a support, wherein the support comprises fluorided alumina; and
   b) the second component comprises the combination of
      i) a metal halide compound, wherein the metal halide compound is a metal dihalide compound or a metal hydroxyhalide compound of a Group IIA or Group IIB metal of the Mendeleev Periodic Table;
      ii) a transition metal compound, wherein the transition metal compound comprises a transition metal of Group IVB or Group VB of the Mendeleev Periodic Table, and wherein the transition metal compound comprises at least one hydrocarbyl oxide ligand, at least one hydrocarbyl amide ligand, at least one hydrocarbyl imide ligand, or at least one hydrocarbyl thiolate ligand; and
      iii) a precipitating agent, wherein the precipitating agent is an organometallic compound of a Group I, II, or III metal of the Mendeleev Periodic Table; a metal halide or a metal oxyhalide of a Group IIIA, IVA, IVB, VA, or VB metal of the Mendeleev Periodic Table; a hydrogen halide; or an organic acid halide RC(O)X, wherein R is an alkyl, an aryl, a cycloalkyl, or a combination thereof having from 1 to about 12 carbon atoms, and X is a halogen atom.

2. The catalyst system of claim 1, wherein at least some of the chromium is present as hexavalent chromium.

3. The catalyst system of claim 1, wherein the amount of chromium on the support is from about 0.05 to about 5 weight percent based on the weight of the support.

4. The catalyst system of claim 1, wherein the amount of chromium on the support is from about 0.1 to about 3 weight percent based on the weight of the support.

5. The catalyst system of claim 1, wherein the amount of chromium on the support is from 0.8 to 2.5 weight percent based on the weight of the support.

6. The catalyst system of claim 1, wherein the support contains fluoride in an amount from about 1 to about 10 weight percent based on the weight of the support.

7. The catalyst system of claim 1, wherein the support contains fluoride in an amount from about 3 to about 8 weight percent based on the weight of the support.

8. The catalyst system of claim 1, wherein the support has a surface area from about 200 to about 550 square meters per gram.

9. The catalyst system of claim 1, wherein the support has a surface area from about 225 to about 425 square meters per gram.

10. The catalyst system of claim 1, wherein the support has a surface area from about 250 to about 400 square meters per gram.

11. The catalyst system of claim 1, wherein the support has a pore volume from about 0.7 to about 2.5 cubic centimeters per gram.

12. The catalyst system of claim 1, wherein the support has a pore volume from about 0.8 to about 1.8 cubic centimeters per gram.

13. The catalyst system of claim 1, wherein the support has a pore volume from about 1 to about 1.7 cubic centimeters per gram.

14. The catalyst system of claim 1, wherein the support has a surface area from about 200 to about 550 square meters per gram and a pore volume from about 0.7 to about 2.5 cubic centimeters per gram.

15. The catalyst system of claim 1, wherein the metal halide compound is a metal dihalide or metal hydroxyhalide of beryllium, magnesium, calcium, or zinc.

16. The catalyst system of claim 1, wherein the metal halide compound is beryllium dichloride, beryllium dibromide, beryllium hydroxyiodide, magnesium dichloride, magnesium bromide, magnesium hydroxychloride, magnesium diiodide, magnesium difluoride, calcium dichloride, calcium dibromide, calcium hydroxybromide, zinc dichloride, zinc difluoride, or zinc hydroxychloride.

17. The catalyst system of claim 1, wherein the metal halide compound is magnesium dichloride.

18. The catalyst system of claim 1, wherein the transition metal compound is a titanium compound, a zirconium compound, or a vanadium compound.

19. The catalyst system of claim 1, wherein all the ligands of the transition metal compound are the same.

20. The catalyst system of claim 1, wherein the transition metal compound is a titanium tetrahydrocarboxyloxide, a titanium tetraamide, a titanium tetramercaptide, a zirconium tetrahydrocarbyloxide, a zirconium tetraamide, a zirconium tetramercaptide, a vanadium tetrahydrocarbyloxide, a vanadium tetraamide, or a vanadium tetramercaptide.

21. The catalyst system of claim 1, wherein the transition metal compound is a titanium compound.

22. The catalyst system of claim 1, wherein the transition metal compound is a titanium tetrahydrocarbyloxide having the general formula $Ti(OR)_4$, wherein each R is individually an alkyl, a cycloalkyl, an aryl, an alkaryl, or an aralkyl having from 1 to about 20 carbon atoms, wherein each R group can be the same or different from other R groups.

23. The catalyst system of claim 22, wherein the titanium tetrahydrocarbyloxide is a titanium tetraalkoxide.

24. The catalyst system of claim 22, wherein the titanium tetrahydrocarbyloxide is titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide or titanium tetraphenoxide.

25. The catalyst system of claim 22, wherein the titanium tetrahydrocarbyloxide is titanium tetraethoxide.

26. The catalyst system of claim 1, wherein the second component further comprises an anti-caking agent.

27. The catalyst system of claim 26, wherein the anti-caking agent is present in an amount from about 2 to about 20 weight percent based on the weight of the second component.

28. The catalyst system of claim 26, wherein the anti-caking agent comprises a fumed refractory oxide.

29. The catalyst system of claim 28, wherein the fumed refractory oxide is fumed silica, fumed titanium dioxide, or fumed alumina.

30. The catalyst system of claim 1, wherein the transition metal compound and the metal halide compound are present in a molar ratio from about 10:1 to about 1:10 of transition metal compound to metal halide compound.

31. The catalyst system of claim 1, wherein the transition metal compound and the metal halide compound are present in a molar ratio from about 3:1 to about 0.5:2 of transition metal compound to metal halide compound.

32. The catalyst system of claim 1, wherein the transition metal compound and the metal halide compound are present in a molar ratio from about 2:1 to about 1:2 of transition metal compound to metal halide compound.

33. The catalyst system of claim 1, wherein:
the transition metal compound is a titanium tetrahydrocarbyloxide;
the metal halide compound is magnesium dichloride; and
the titanium tetrahydrocarbyloxide and the magnesium dichloride are present in a molar ratio from about 2:1 to about 1:2 of titanium tetrahydrocarbyloxide to magnesium dichloride.

34. The catalyst system of claim 1, wherein the transition metal compound and the metal halide compound are present in a molar ratio from about 2:1 to about 1:2 of transition metal compound to metal halide compound.

35. The catalyst system of claim 1, wherein the second component further comprises an anti-caking agent comprising fumed silica, fumed titanium dioxide, or fumed alumina present in an amount from about 2 to about 20 weight percent based on the weight of the second component.

36. The catalyst system of claim 1, wherein the first component has been activated at a temperature from about 500° C. to about 900° C.

37. The catalyst system of claim 1, wherein at least a portion of the chromium is in a reduced state.

38. The catalyst system of claim 1, wherein the precipitating agent is a lithium alkyl compound, a Grignard reagent, a dialkyl magnesium compound, a dialkyl zinc compound, or a hydrocarbyl aluminum halide compound.

39. The catalyst system of claim 1, wherein the precipitating agent is a dihydrocarbylaluminum monohalide $R'_2AlX$, a monohydrocarbylaluminum dihalide $R'AlX_2$, or a hydrocarbylaluminum sesquihalide $R'_3Al_2X_3$, wherein each R' is individually a linear or a branched chain hydrocarbyl radical containing from 1 to about 20 carbon atoms, wherein each R' group can be the same or different from other R' groups.

40. The catalyst system of claim 1, wherein the precipitating agent is methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, or ethylaluminum sesquiiodide.

41. The catalyst system of claim 1, wherein the precipitating agent is ethylaluminum sesquichloride, ethylaluminum dichloride, or diethylaluminum chloride.

42. The catalyst system of claim 1, wherein the precipitating agent is aluminum tribromide, aluminum trichloride, aluminum triiodide, tin tetrabromide, tin tetrachloride, silicon tetrabromide, silicon tetrachloride, phosphorous oxychloride, phosphorous trichloride, phosphorous pentabromide, vanadium tetrachloride, vanadium oxytrichloride, vanadyl trichloride, or zirconium tetrachloride.

43. The catalyst system of claim 1, wherein the precipitating agent is hydrogen chloride or hydrogen bromide.

44. The catalyst system of claim 1, wherein the precipitating agent is acetyl chloride, propionyl fluoride, dodecanoyl chloride, 3-cyclopentylpropionyl chloride, 2-naphthoyl chloride, benzoyl bromide, or benzoyl chloride.

45. The catalyst system of claim 1, wherein the catalyst system further comprises a first cocatalyst comprising a trialkyl boron compound.

46. The catalyst system of claim 45, wherein the alkyl groups of the trialkyl boron compound have from 1 to about 10 carbon atoms.

47. The catalyst system of claim 45, wherein the trialkyl boron compound is triethylboron, tripropylboron, or trimethylboron.

48. The catalyst system of claim 45, wherein the first cocatalyst is triethylboron.

49. The catalyst system of claim 1, wherein the catalyst system further comprises a second cocatalyst comprising a trialkylaluminum compound.

50. The catalyst system of claim 49, wherein the alkyl groups of the trialkylaluminum compound have from 1 to about 10 carbon atoms.

51. The catalyst system of claim 49, wherein the trialkylaluminum compound is triethylaluminum, tripropylaluminum, or trimethylaluminum.

52. The catalyst system of claim 49, wherein the second cocatalyst is triethylaluminum.

53. The catalyst system of claim 1, wherein the second component further comprises a halide ion exchanging source.

54. The catalyst system of claim 53, wherein the halide ion exchanging source is titanium tetrachloride, titanium tetrabromide, vanadium oxychloride, or zirconium tetrachloride.

55. The catalyst system of claim 1, wherein the second component further comprises a prepolymer prepared by contacting the second component with an olefinic monomer.

56. The catalyst system of claim 55, wherein the olefinic monomer is ethylene, propylene, 1-butene, 1-pentene, 1-hexene, 1-heptene, 1-octene, 1-nonene and 1-decene and mixtures of one or more thereof.

57. The catalyst system of claim 1, wherein the second component further comprises a halide ion exchanging source and a prepolymer, wherein:
  the halide ion exchanging source is titanium tetrachloride, titanium tetrabromide, vanadium oxychioride, or zirconium tetrachloride; and
  the prepolymer is prepared by contacting the second component with an olefinic monomer.

58. A catalyst system comprising a first component and a second component wherein:
  a) the first component comprises chromium on a support, wherein the support comprises fluorided alumina; and
  b) the second component comprises the combination of
    i) a metal halide compound, wherein the metal halide compound is a metal dihalide compound or a metal hydroxyhalide compound of a Group IIA or Group IIB metal of the Mendeleev Periodic Table;
    ii) a transition metal compound, wherein the transition metal compound comprises a transition metal of Group IVB or Group VB of the Mendeleev Periodic Table, and wherein the transition metal compound comprises at least one hydrocarbyl oxide ligand, at least one hydrocarbyl anilde ligand, at least one hydrocarbyl imide ligand, or at least one hydrocarbyl thiolate ligand; and
    iii) a precipitating agent, wherein the precipitating agent is an organometallic compound of a Group I, II, or III metal of the Mendeleev Periodic Table; a metal halide or a metal oxyhalide of a Group IIIA, IVA, IVB, VA, or VB metal of the Mendeleev Periodic Table; a hydrogen halide; or an organic acid halide RC(O)X, wherein R is an alkyl, an aryl, a cycloalkyl, or a combination thereof having from 1 to about 12 carbon atoms, and X is a halogen atom;
wherein the second component is pretreated with triethylaluminum.

* * * * *